United States Patent
No et al.

(10) Patent No.: US 12,277,147 B1
(45) Date of Patent: Apr. 15, 2025

(54) GEOSPATIAL ANALYSIS AND DATA EXPORT

(71) Applicant: T-Mobile USA, Inc., Bellevue, WA (US)

(72) Inventors: James No, Covington, WA (US); Farrah Lee, Bellevue, WA (US); Taha Lahrichi, Bellevue, WA (US); Jeny Bhimani, Bothell, WA (US); Jacob Holman, Bonney Lake, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/584,612

(22) Filed: Feb. 22, 2024

(51) Int. Cl.
*G06F 16/00* (2019.01)
*G06F 16/248* (2019.01)
*G06F 16/29* (2019.01)

(52) U.S. Cl.
CPC ............ *G06F 16/29* (2019.01); *G06F 16/248* (2019.01)

(58) Field of Classification Search
CPC .. G06F 3/04842; G06F 3/04845; G06F 16/29; G06F 16/24578; G06F 3/0485; G06F 3/0482; G06F 2203/04806; G06F 16/9537; G06F 16/732; G06F 16/248; G06F 16/287; G06F 16/244; G06F 16/5866; G06F 16/338; G06F 16/20; G06F 16/35; G06F 16/387; G06Q 10/06; G06Q 50/08; H04W 4/029; H04N 21/4728; G08G 1/20; G09B 29/007
See application file for complete search history.

(56) References Cited

U.S. PATENT DOCUMENTS

| | | | |
|---|---|---|---|
| 8,224,867 | B2 | 7/2012 | Evans |
| 8,250,481 | B2 | 8/2012 | Klaric et al. |
| 8,306,971 | B2 | 11/2012 | Stolte et al. |
| 9,576,015 | B1 | 2/2017 | Tolnay et al. |
| 9,798,748 | B2 | 10/2017 | Brocato et al. |
| 10,157,234 | B1 | 12/2018 | Alagappan et al. |
| 10,216,760 | B2 | 2/2019 | Slifer |
| 10,430,444 | B1 | 10/2019 | Hampton et al. |
| 10,885,066 | B2 | 1/2021 | Lawlor et al. |
| 11,106,706 | B1 | 8/2021 | Bates et al. |

(Continued)

FOREIGN PATENT DOCUMENTS

EP 3723032 A1 10/2020

*Primary Examiner* — Yicun Wu
(74) *Attorney, Agent, or Firm* — Perkins Coie LLP

(57) ABSTRACT

A system can receive datasets having a plurality of records, at least one dataset including wireless telecommunications network coverage data. A system can transform the records to a standardized format. A system can perform geospatial calculations for each record to determine predefined geographic areas, each having a geographic area type. A system can associate each record with the corresponding predefined geographic areas. A system can generate transformed datasets including transformed records and indications of the associated predefined geographic areas. A system can provide a graphical user interface having a map, an input for selecting a transformed dataset, and an input for selecting a geographic area type. A system can receive a selection of a transformed dataset and a geographic area type. A system can receive a selection of a geographic area via the map. A system can be configured to generate an output dataset based on the selections.

20 Claims, 14 Drawing Sheets

(56) References Cited

U.S. PATENT DOCUMENTS

| | | | |
|---|---|---|---|
| 11,934,430 B2* | 3/2024 | Bhimani | G06F 16/29 |
| 12,072,916 B2* | 8/2024 | Bhimani | G06F 16/2455 |
| 2012/0213416 A1 | 8/2012 | Lorimer et al. | |
| 2023/0367811 A1* | 11/2023 | Bhimani | G06F 16/909 |

* cited by examiner

GEOSPATIAL ANALYSIS AND DATA EXPORT

BACKGROUND

Geospatial calculations play an important role in the design and deployment of wireless telecommunications networks, the placement of retail stores, and so forth. Geospatial datasets can enable spatial queries in which data can be retrieved based on spatial relationships. For example, "point-in-polygon" queries can be used to determine points that are located inside a particular area, such as stores inside a city, base stations in an engineering market, and so forth. Spatial queries can also include nearest neighbor searches, overlay operations (e.g., union, intersection, difference), and so forth. In some cases, geospatial datasets can be used for topographical analysis. For example, geospatial data can be used to determine if a base station's signal could be blocked by nearby hills or other geological features. In some cases, geospatial datasets can include information about manufactured structures such as buildings that can interfere with radio signals.

While geospatial analysis can be important, calculations can be complex and time-consuming, and some user expertise can be required to effectively work with geospatial data. Geospatial analysis can involve the use of complex algorithms, large datasets, and so forth. Geometric complexity can make calculations significantly more computationally demanding. For example, determining points inside a simple geometric object such as a circle, square, or rectangle can be straightforward; however, areas of interest for geospatial analysis can often be represented by complex polygons. For example, the boundary of a polygon can follow natural features such as mountains, rivers, and coastlines. In some cases, a boundary can, alternatively or additionally, follow non-natural boundaries, such as the boundary of a city, zip code, metropolitan region, combined statistical area, county, state, country, urban area, engineering market, retail market, and so forth.

In some cases, data used in geospatial analysis can come from different sources and can be stored in different formats. Extract, transform, load (ETL) processes can be used in data analytics, data processing, data management, and so forth. ETL can involve extracting data from various sources, transforming the data into a consistent or standardized format, and loading the transformed data into a database, data warehouse, or other data store where it can be accessed and used. ETL can be important for data integration, data cleansing, and ensuring data quality. In some cases, ETL can be used to enrich data, such as by adding additional fields (also referred to herein as attributes) that contain information not present in a source dataset.

Users can struggle to work with geospatial data. Difficulties may be especially pronounced when data is stored in different locations, different formats, and so forth. For example, users may be unfamiliar with the different locations where data is stored, may not have access credentials, may lack knowledge of how to pull desired data (e.g., how to perform SQL queries), and so forth. Extracting relevant data can present further difficulties. For example, a user who wants to see the geographic distribution of stores in a particular market can encounter difficulty loading data into a geospatial analysis tool and selecting the relevant data (e.g., stores in a particular market, such as an urban area).

BRIEF DESCRIPTION OF THE DRAWINGS

Detailed descriptions of implementations of the present invention will be described and explained through the use of the accompanying drawings.

Figure 1:
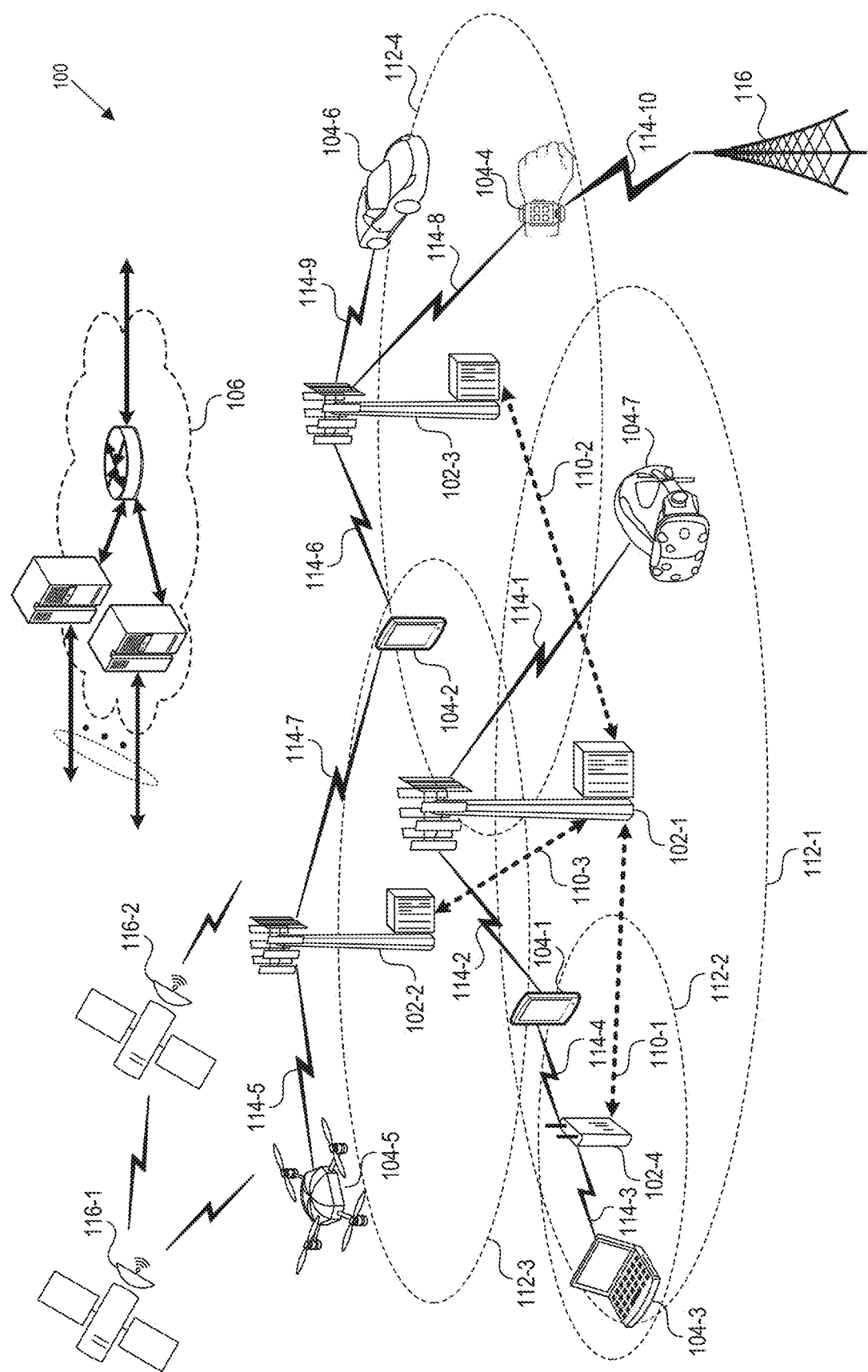
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Geospatial analysis can play an important role in business decisions, engineering decisions, and so forth. For example, a wireless telecommunications company can have a need to know how its network is performing in different geographic areas, the status of a network rollout (e.g., 5G deployment) in different geographic areas, and so forth. Similarly, a telecommunications company or other company can use geospatial data when determining store locations. For example, geospatial information can help visualize where there is a strong store presence, where it may make sense to close stores (e.g., due to there being more stores than the population can support), or where there is a need for more stores. In some cases, store data, network data, or other data created by the telecommunications company can be overlaid with information such as population density, income information, traffic data, and so forth. For example, an area near a highway with a large amount of traffic may be a good candidate for increased network coverage, even if the resident population is small. Similarly, an area with relatively high incomes can be a good candidate for the rollout of a more expensive service.

Geospatial information related to a wireless telecommunications network can be used by network engineering teams, but its use is not limited to engineering. For example, in some cases, customer service teams can use geospatial information about the wireless telecommunications network, for example to determine if there is a known outage or other service interruption in a geographic area. For example, if a customer connects with a support agent to complain of poor performance or dropped calls, the support agent can access a map to view any known problems in the customer's location (e.g., a number of off-air base stations, a number of stations experiencing atypically heavy loads, and so forth).

While there are many uses for geospatial data, for example to monitor network rollouts, track key performance indicators (KPIs), monitor the health of the network, and so forth, using geospatial data can prove difficult. Calculations can take a long time to complete, and source data can be located in many different locations, stored in many different formats, and so forth. For example, even different frequencies in a wireless telecommunications network can be controlled by different engineering teams, who can make different decisions about where and how data is collected and stored. Different radio engineering teams can store data in different databases or other data stores, can use different schemas, different field formats, and so forth. Retail groups can store data in yet other formats. For example, an engineering team could store the latitude, longitude, and elevation of a base station, while a retail team may store the location of a retail store as a street address.

To make use of geospatial data, it can be important to collect data from multiple sources, to transform data to conform to standardized formats, and so forth. In some implementations, ETL processes can be used to convert data to standardized formats, to enrich data, and so forth. For example, a retail team may store the location of a retail store as a street address. In some cases, an ETL process can include determining the latitude and longitude of the retail store based on the street address, and the latitude and longitude can be loaded into a database, data warehouse, or the like. Additionally, it can be significant to perform geospatial calculations ahead of time. For example, common geospatial calculations (e.g., the locations of base stations within engineering markets) can be carried out before a user requests such information. Thus, instead of waiting minutes or hours for calculations to complete, geospatial data can be pre-calculated and queried easily and quickly.

Often, making use of geospatial data can involve specialized knowledge, such as SQL, knowledge of certain geospatial analysis programs, and so forth. In some cases, users may lack this knowledge and thus may be unable to make use of geospatial data, can make errors in the use of geospatial data, or can take an excessive amount of time to use geospatial data. Moreover, even if a user is knowledgeable, as discussed above, carrying out calculations can take a significant amount of time. Thus, for example, using geospatial data while on a support call can be infeasible as placing a customer on hold for minutes or hours while calculations are run would result in a negative customer experience, support agent inefficiency, and so forth. Engineering teams may also need rapid access to geospatial data. For example, if there is an outage or other issue in an area, an engineering team may need to respond quickly and may not have time to wait for complex calculations to complete.

In some implementations described herein, backend and frontend systems can enable the rapid, easy retrieval and use of geospatial data. In some implementations, calculations can be predefined and performed before a user requests data. In some implementations, a graphical user interface can provide a map, checkboxes, dropdowns, and so forth so that a user can easily select geographic areas of interest, datasets of interest, and so forth. In some implementations, the graphical user interface can provide summary information within the interface. In some implementations, the graphical user interface can provide detailed information. For example, in some implementations, a user can hover their mouse over a base station and the graphical user interface can display a popup, overlay, inspection panel, or the like that contains additional details about the base station.

According to some implementations, users can obtain summary data, such as the number of on-air base stations in an area, the number of stores in an area, and so forth. In some implementations, users can export data for further analysis, for example to a comma separated value file, a tab separated value file, an xml file, a JSON file, an Office Open XML Workbook file (e.g., .xlsx file), an OpenDocument spreadsheet file (e.g., .ods file), a Tableau file, an Apache Parquet file, an Esri Shapefile file, a Geographic JavaScript Object Notation (GeoJSON) file, a Geography Markup Language (GML) file, a Google Keyhole Markup Language (KML) file, a GPS Exchange Format (GPX) file, or an OpenStreetMap XML (OSM) file.

In some implementations, when exporting to certain formats such as to a spreadsheet file (e.g., an Office Open XML Workbook file (Excel file) or an OpenDocument spreadsheet file), data can be organized in various ways. For example, if a user selects multiple datasets to summarize, different datasets can be summarized in different sheets (e.g., one sheet per dataset), in a single sheet with different columns for different data, or in a single sheet with a column indicating the source of the data, which may make sorting, filtering, and other operations simpler.

By letting users export data from multiple disparate datasets into a single file, users (e.g., engineers) can gain insights into multiple datasets, for example to compare the deployment of a first frequency with the deployment of a second frequency, to compare load on one band to load on another band, to compare error rates across bands, and so forth.

In some implementations, a first set of datasets can be available for display on a map and summarization, while a second, smaller set of datasets (e.g., a subset of the first set of datasets) can be available for export. This can be done for a variety of reasons, for example to help protect critical business information. For example, sensitive information may not be available for download or may only be made available to download for certain users with a business need for the detailed information available in an exported dataset.

In some implementations, some users can have export permissions while other users may not have export permissions. For example, in some implementations, customer support agents can have permission to view maps and see summaries of data, but they may not be able to export datasets. In contrast, radio engineering teams can be able to export data. In some implementations, access controls can provide a level of data access appropriate to a user's role while restricting access so as to protect sensitive information. For example, a support agent can benefit from being able to see the status of base stations in a customer's location, but they may not have a business need to view detailed information about each base station, such as detailed configuration information, hardware information, software information, etc.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
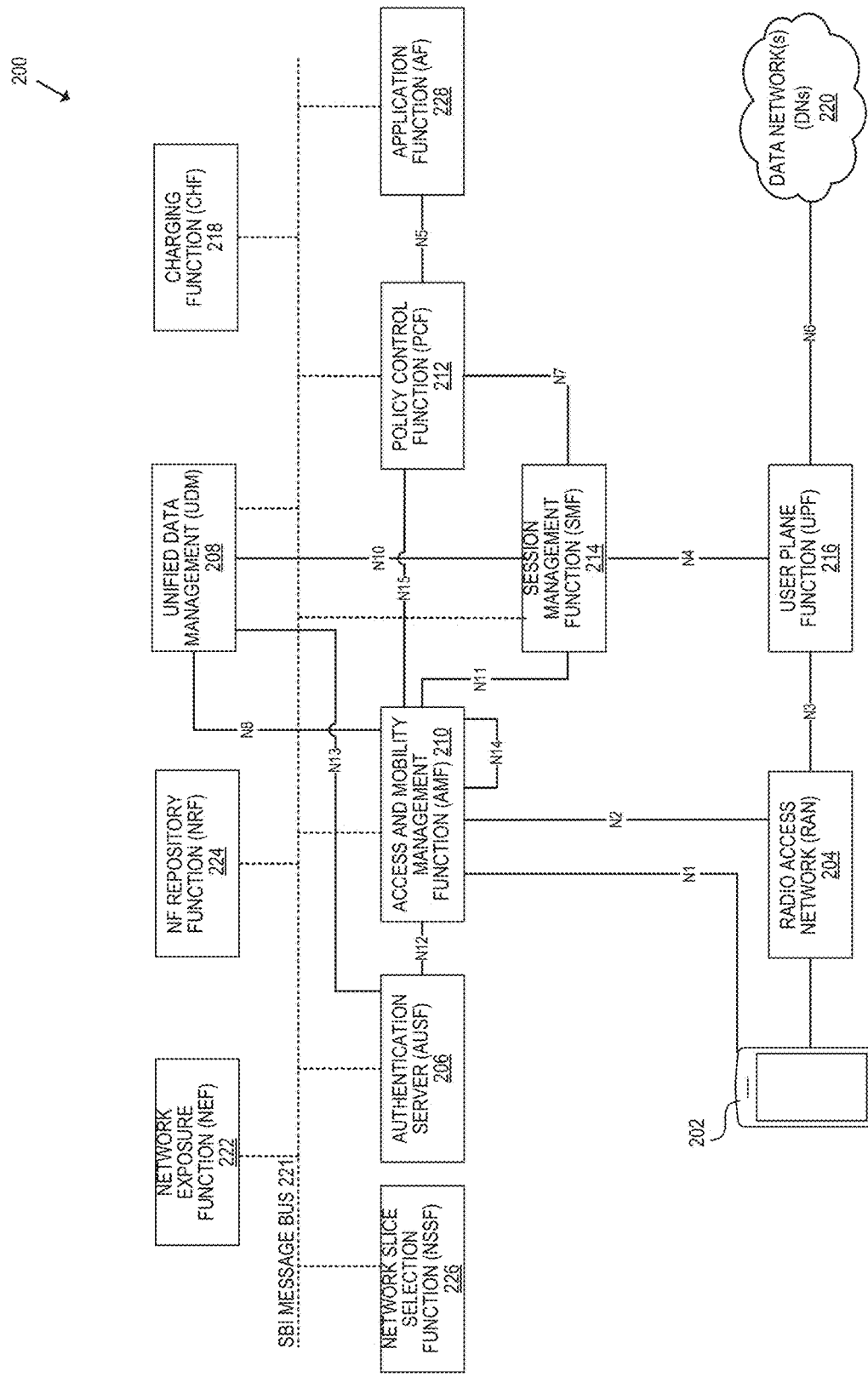
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Geospatial Analysis and Data Export

Figure 3:
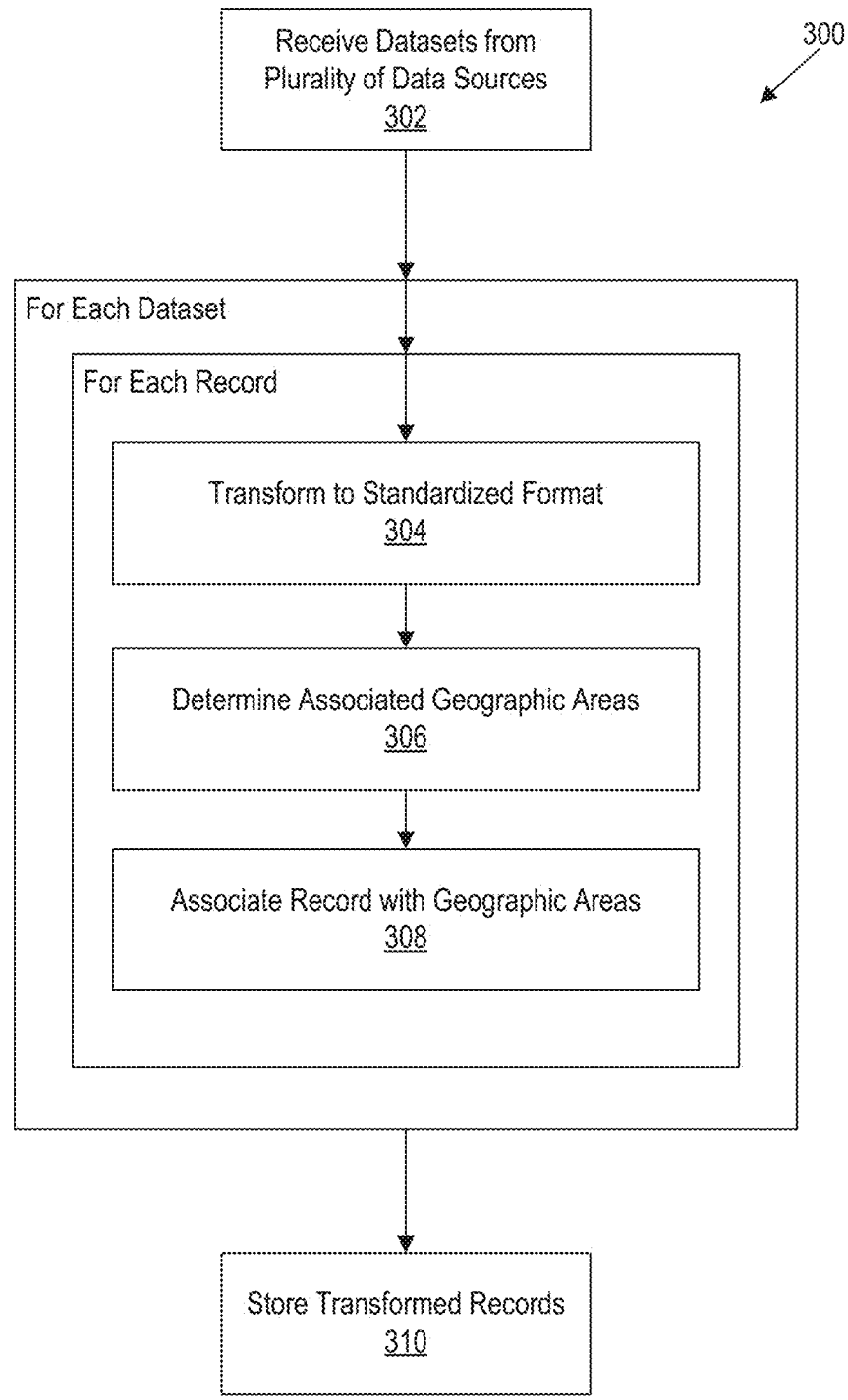
FIG. 3 is a block diagram that illustrates an example process for preparing a geospatial dataset for use in a geospatial analysis and data export platform as described herein.

FIG. 3 is a block diagram that illustrates an example process for preparing a geospatial dataset for use in a geospatial analysis and data export platform as described herein. The process 300 can be used retrieve data and prepare it for use in geospatial analysis, data export, or both. The process 300 can be carried out on a computing system or multiple computing systems.

At operation 302, a computing system can receive datasets from a plurality of data sources. In some implementations, the computing system can be configured to pull data from the plurality of data sources, for example by executing queries on the plurality of data sources. In some implementations, the computing system can be configured to pull data from the data sources on an hourly, daily, weekly, or other schedule. In some implementations, the plurality of data sources can be configured to push data to the computing system, for example on an hourly, daily, weekly, or other schedule. While data may frequently be stored in a database, the computing system can also be configured to retrieve data from text files (e.g., JSON, TXT, CSV, TSV, etc.), spreadsheets, and/or other files. In some cases, such files may be stored on a file server that is accessible by the computing system.

Each dataset of the plurality of datasets can include one or more records. The process 300 can include, for each record in each dataset, transforming the record to a standardized format at operation 304, determining associated geographic areas at operation 306, and associating each record with the associated geographic areas at operation 308. For example, in some implementations, the process 300 can include adding one or more fields to each record to indicate one or more associated geographic areas. For example, the associated geographic areas for a record can include a store footprint area, a network coverage area, competitor area, engineering market, engineering region, sales region, FCC area, FCC auction area, metropolitan statistical area, combined statistical area, county, state, city, zip code, local access and transport area, designated market area, core-based statistical area, and/or any other predefined geographic area type. For example, for a given geographic area type, the computing system can perform a geospatial calculation to determine which polygon(s) the record should be associated with (e.g., for a geographic area type of "state," the polygon for a cell tower located in San Francisco can be a polygon representing the state of California). At operation 310, the computing system can store the transformed records in a database or other data store.

Figure 4:
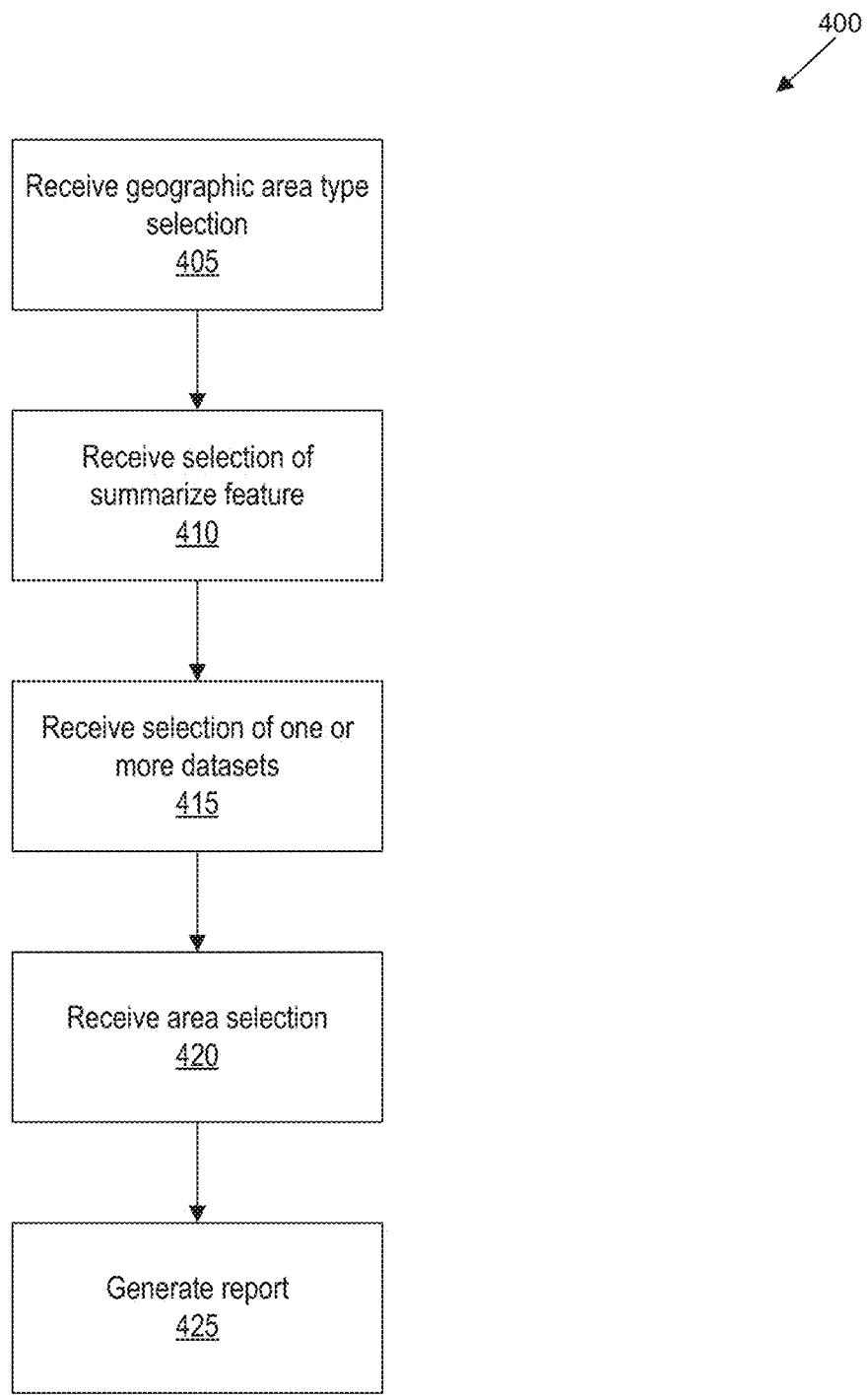
FIG. 4 is a block diagram that illustrates an example process for generating a data summary report.

FIG. 4 is a block diagram that illustrates an example process 400 for generating a data summary report. At operation 405, a computing system receive a geographic area type selection (e.g., engineering market, state, county, region, urban area, etc.). The graphical user interface can include a button or other user interface element that can allow the user to enable a summarize feature. At operation 410, the computing system can receive an indication that the user has clicked the button or otherwise engaged with a user interface element to select the summarize feature. The graphical user interface can provide functionality that allows a user to select one or more datasets for which a summary report is desired. At operation 415, the computing system can receive a selection of one or more datasets for which the user desires a summary report. The graphical user interface can enable a user to select one or more areas for generating the summary report. At operation 420, the computing system can receive a user selection of one or more geographic areas (for example, if the geographic area type is "state," the user can select one or more states on the map). At operation 425, the system can generate a report. The report can include a summary of the one or more selected datasets. For example, the report can include a summary indicating the number of base stations operating at a particular frequency, the number of stores in the selected one or more areas, and so forth.

Figure 5:
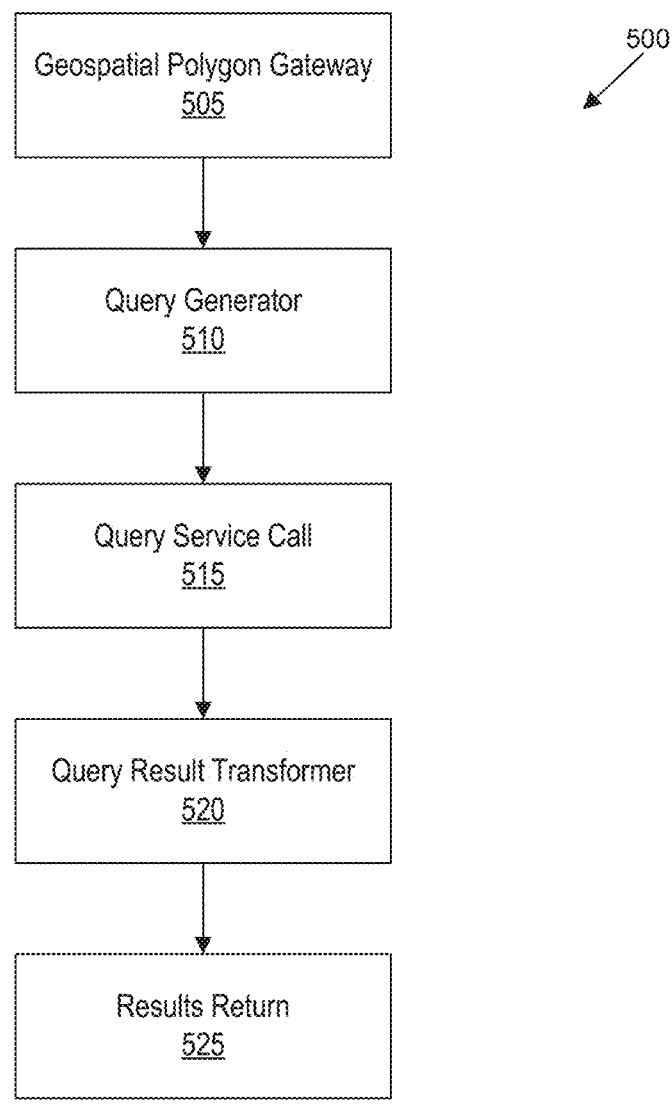
FIG. 5 is a block diagram that illustrates an example process for generating a data summary report.

FIG. 5 is a block diagram that illustrates an example process 500 for generating a data summary report. The process of FIG. 5 can be used to support the process 400 illustrated in FIG. 4. At operation 505, a computing system utilizes a geospatial polygon gateway. The geospatial polygon gateway can provide geospatially-coded data included in a plurality of datasets, for example transformed datasets as described above with respect to FIG. 3. At operation 510, a query generator can, based on selections received from a user, generate a query that can be used to create a summary of selected data, selected geographic areas, and so forth. At operation 515, the computing system can execute a query service call to retrieve the selected data. At operation 520, the computing system can utilize a query result transformer to transform the results of the query service call at operation 515 into a summary. At operation 525, the computing system can cause the summary to be viewable by the user, for example by updating a user interface so that the user interface includes a data summary. The summary can include information such as total count, average utilization, peak utilization, capacity, uptime, or any other information.

Figure 6:
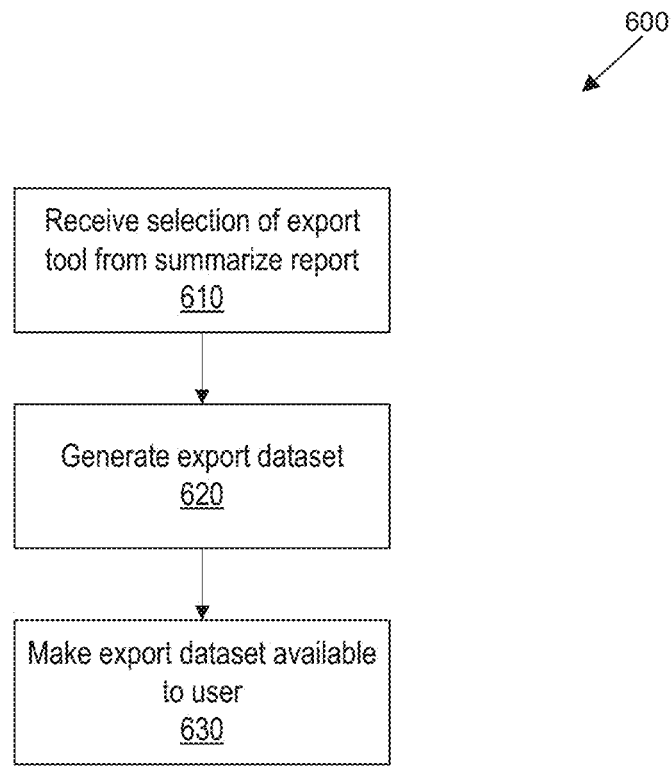
FIG. 6 is a block diagram that illustrates an example process for exporting data.

FIG. 6 is a block diagram that illustrates an example process 600 for exporting data. A user can select an export tool from a summarize report or another part of a user interface, such as a data selection sheet or popup. At operation 610, a computing system receives an indication of the selection of the export tool. At operation 620, the computing system generates an export dataset. The export dataset can include some or all of the data used to generate the map as well as additional data not shown on the map (e.g., store address, base station identifier, latitude, longitude, elevation, output power, antenna orientation, and so forth). At operation 630, the computing system makes the exported data available to the user. In some implementations, data can download automatically. In some implementations, the user can be directed to a web page to download the data. In some implementations, a user interface can dynamically update to provide a link, button, or other user interface element that can be used to download the data. In some implementations, the computing system can be configured to provide the user with an option to save the exported data to a location such as a database, cloud storage, or other location. In some implementations, a user interface can include an interface element that enables the user to select an output format, such as CSV, Excel, JSON, SQL file, or any other file type.

Figure 7:
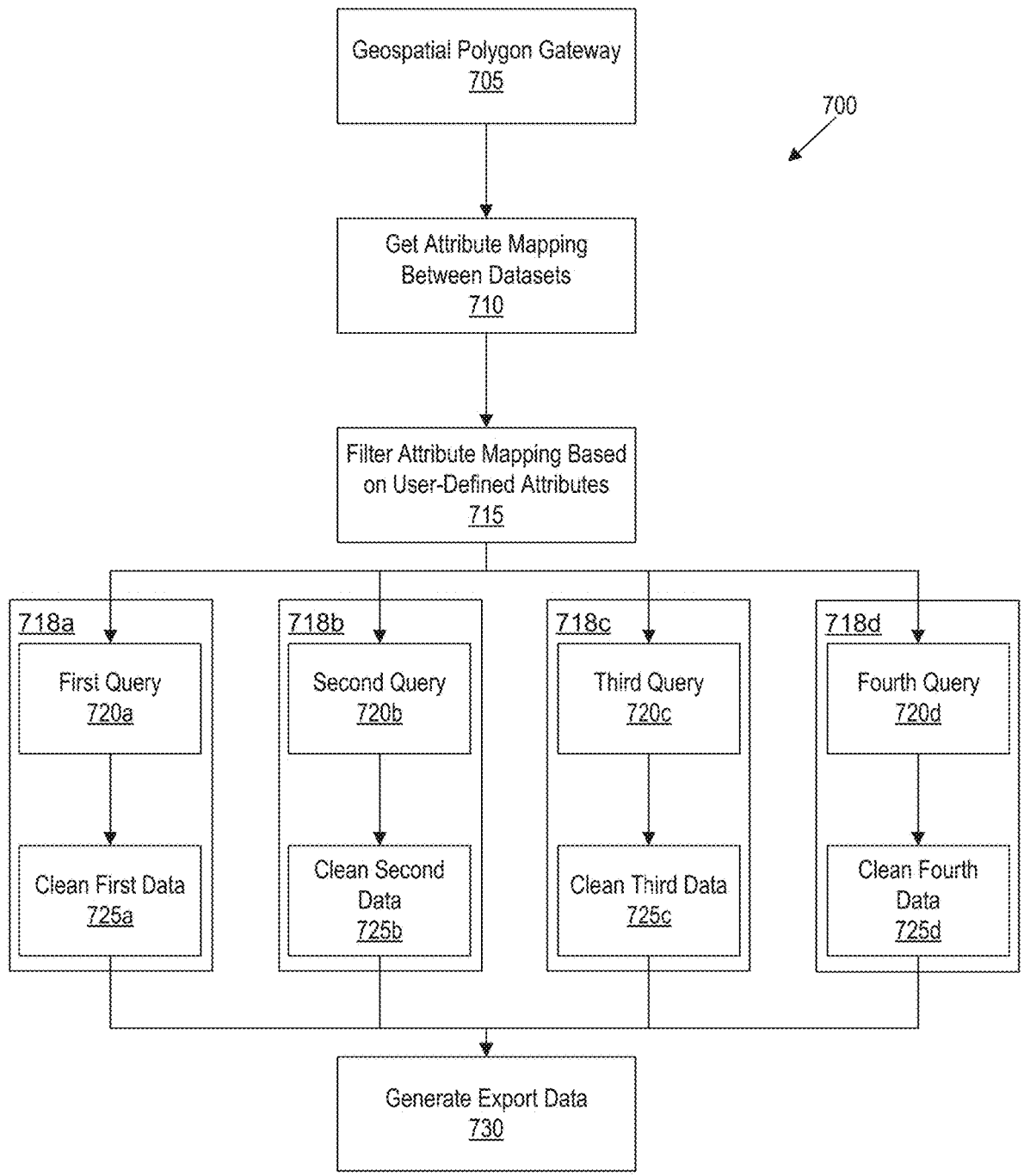
FIG. 7 is a block diagram that illustrates another example process for exporting data.

FIG. 7 is a block diagram that illustrates an example process 700 for exporting data. At operation 705, a computing system can use a geospatial polygon gateway to retrieve datasets. At operation 710, the computing system can get an attribute mapping between datasets (e.g., a mapping of fields in the datasets). At operation 715, the computing system can filter the attribute mapping based on user-defined attributes. For example, a user may only wish to see certain data from a dataset. At steps 720a-720d, the computing system can execute a plurality of queries using a plurality of state machines to retrieve the data requested by the user. At steps 725a-725b, the computing system can execute a plurality of data cleaning operations using the plurality of state machines to modify the requested data, for example to conform to standardized or requested data output formats. In some implementations, the queries 720a-720d can be executed as lambda functions operating in state machines 718a-718d. In some implementations, the data cleaning operations 725a-725b can be executed as lambda functions operating in the state machines 718a-718d. The cleaning operations can include, for example, removing one or more attributes and/or reformatting one or more attributes, for example to conform to a standardized format. Lambda functions can be functions that can be executed without previously provisioning servers on which to run the functions. That is, a backend service can automatically provision servers as needed for executing lambda functions. Lambda functions can be triggered by events, such as changes to data, HTTP requests, API requests, and so forth. In some implementations, the state machines can be run in parallel, such that a user experiences similar system performance without regard to the number of datasets selected for export. At operation 730, the computing system can generate export data for the user. Generating the exported data can include combining multiple datasets cleaned by cleaning operations 725a-725d.

It will be appreciated that while four state machines are depicted in FIG. 7, the number of state machines can vary. For example, in some implementations, the number of state machines can be equal to the number of datasets selected for export. Moreover, while FIG. 7 illustrates the use of state machines to carry out certain operations, other implementations are possible. For example, queries, cleaning operations, and so forth can be executed in a more traditional manner using a pre-provisioned server.

Additionally, while described in terms of a single computing system, it will be appreciated that multiple computing systems can be used to carry out the process 700. For example, different state machines can be executed on different computing systems. Such an approach can enable horizontal scaling such that performance is not significantly impacted by the number of datasets selected by a user or the number of users exporting data. In some implementations, the number of computing systems involved in carrying out the process 700 can be automatically scaled up and down based on user demands for data exports.

Figure 8A:
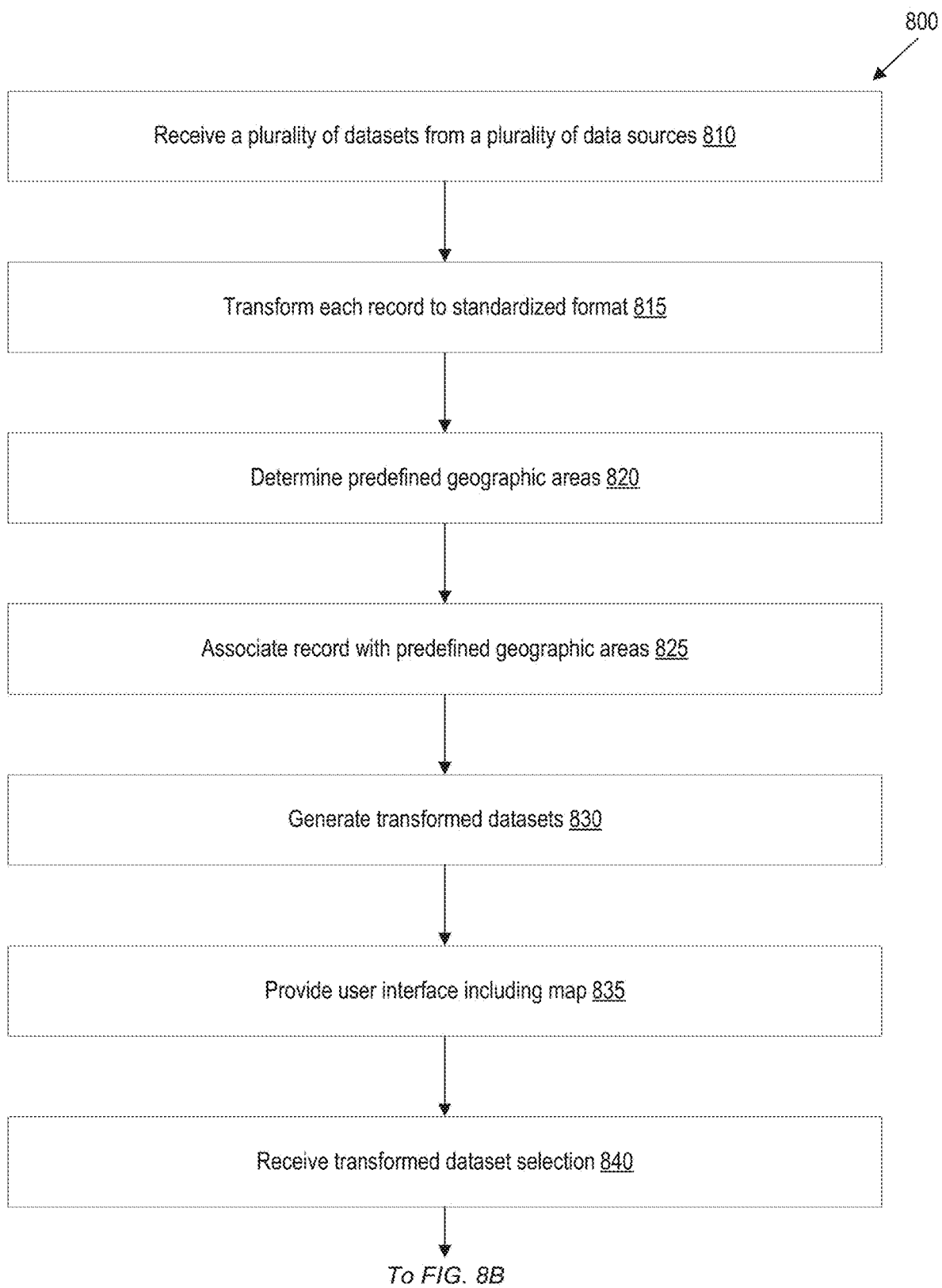
FIGS. 8A and 8B are a block diagram that illustrates an example data export process.
Figure 8B:
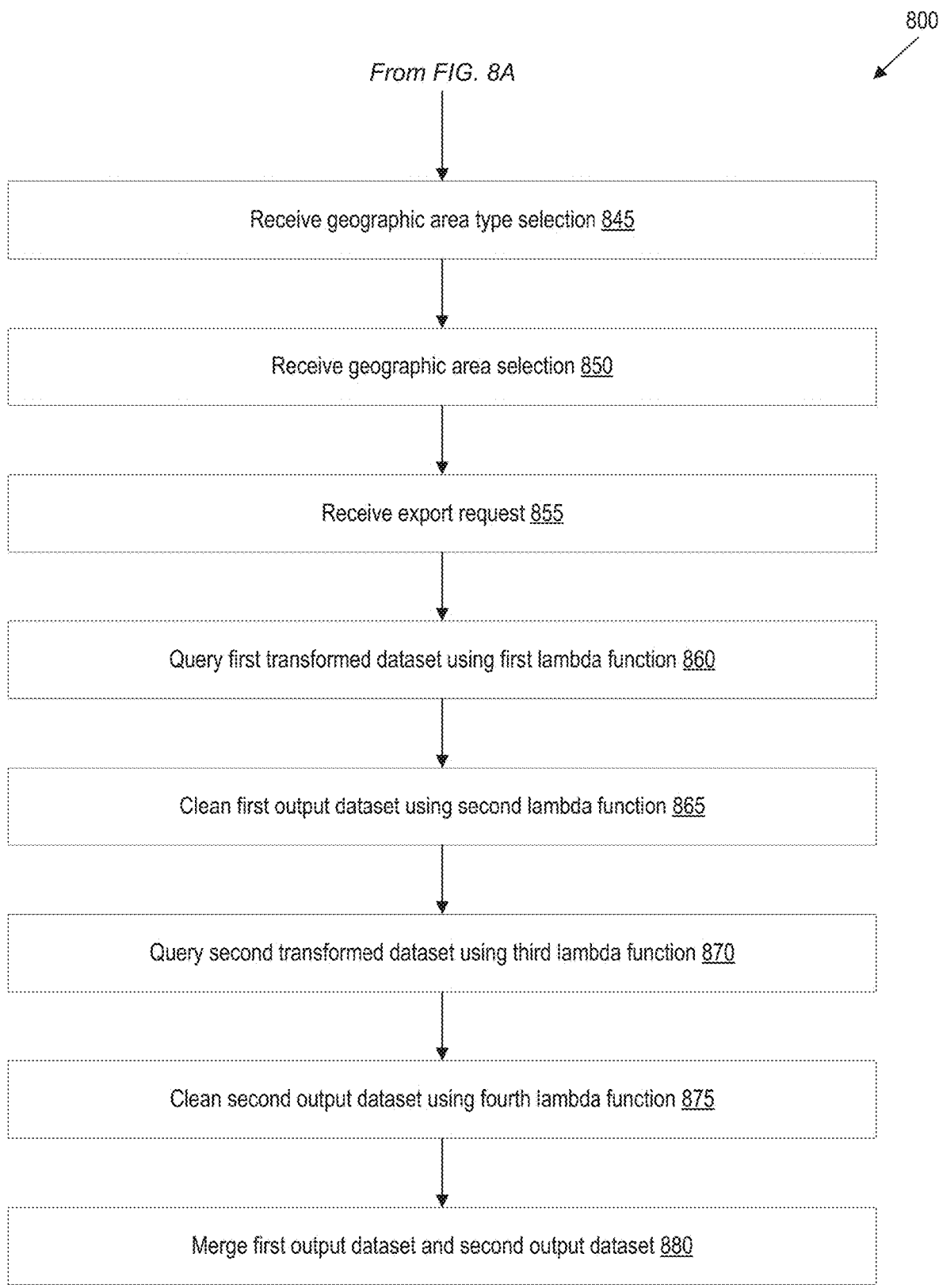

FIGS. 8A and 8B are a block diagram that illustrates a data export process 800. The process 800 can be executed on one or more computing systems (referred to singularly or collectively as "computer system" unless context clearly indicates otherwise). At operation 810, the computing system can receive a plurality of datasets from a plurality of data sources. At operation 815, the computing system can transform each record of each dataset to a standardized format. At operation 820, the computing system can determine predefined geographic areas, for example by querying a database or other data store that contains definitions for the predefined geographic areas. At operation 825, the computing system can determine one or more geographic areas associated with each record and can store the association of each record with the one or more geographic areas (for example, a base station can be located in a state, city, zip code, engineering region, engineering market, and so forth). At operation 830, the computing system can generate transformed datasets. The transformed datasets include the standardized records and the associations of each standardized record with one or more predefined geographic areas. At operation 835, the computing system can provide a user interface to a user. The user interface can include a map. At operation 840, the computing system can receive, based on a user input, a selection of datasets. In the example process 800, it is assumed that two datasets are selected; however, the user can select any number of available datasets, for example, one, two, three, four, five, six, seven, eight, nine, ten, or more datasets. At operation 845, the computing system can receive, based on a user input, a geographic area type selection (e.g., engineering markets, cities, metropolitan statistical areas, states, etc.). At operation 850, the computing system can receive a geographic area selection. At operation 855, the computing system can receive an input from the user requesting a data export. At operation 860, the computing system can query a first dataset of the selected datasets using a first lambda function and a first state machine to generate a first output dataset. At operation 865, the computing system can clean the first output dataset using a second lambda function and the first state machine. At operation 870, the computing system can query a second dataset of the selected datasets using a third lambda function and a second state machine to generate a second output dataset. At operation 875, the computing system can clean the second output dataset using a fourth lambda function and the second state machine. In some implementations, the first state machine and the second state machine can execute serially. In some implementations, the first state machine and the second state machine can execute in parallel or substantially in parallel. In some implementations, state machines may not be used to perform the querying and/or cleaning at steps 860-875. At operation 880, the computing system can merge the cleaned first output dataset and the cleaned second output dataset to generate a single output file that can be provided to the user.

Figure 9:
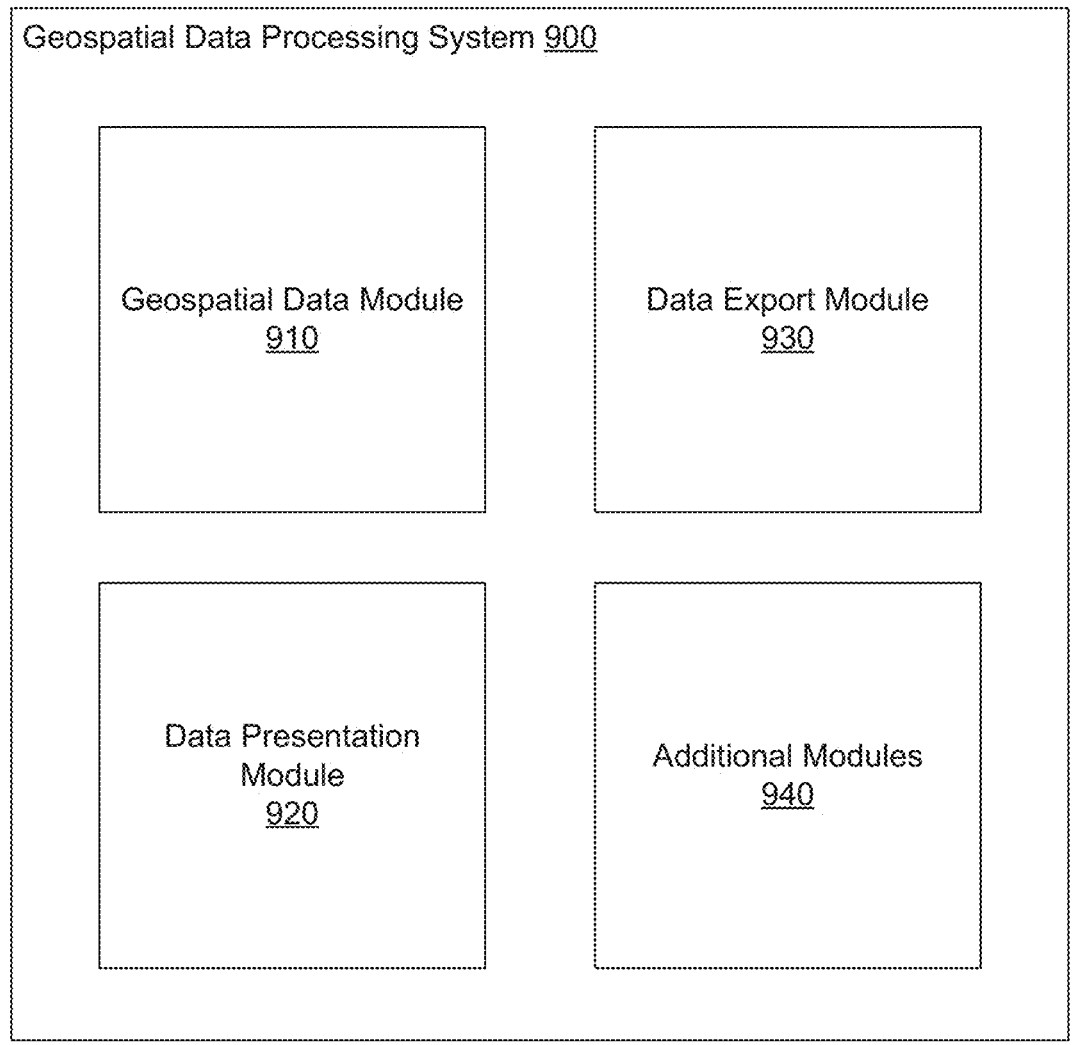
FIG. 9 is a block diagram that illustrates an example geospatial data processing system.

FIG. 9 is a block diagram that illustrates an example geospatial data processing system. The geospatial data processing system 900 can be used to carry out one or more processes as described herein. The geospatial data processing system 900 can include a geospatial data module 910, a data presentation module 920, and a data export module 930. In some implementations, the geospatial data processing system 900 can include additional modules 940. The geospatial data module 910 can be used to retrieve data from one or more datasets, perform geospatial calculations, generate transformed datasets (e.g., datasets that have been transformed to standardized formats and with geospatial information appended or otherwise linked to records in the datasets). The data presentation module 920 can include features for displaying and working with geospatial data. For example, the data presentation module 920 can be configured to provide a user interface to enable a user to interact with geospatial data. The user interface can include a map and one or more controls. The controls can enable the user to select a geographic area type and one or more datasets. The controls can enable the user to export selected data. The data presentation module 920 can be configured to display information, such as a summary of a geospatial dataset. For example, the data presentation module 920 can be configured to display a summary of the number of base stations, number of on-air base stations, number of off-air base stations, number of stores, and so forth in one or more selected geographic areas.

Figure 10:
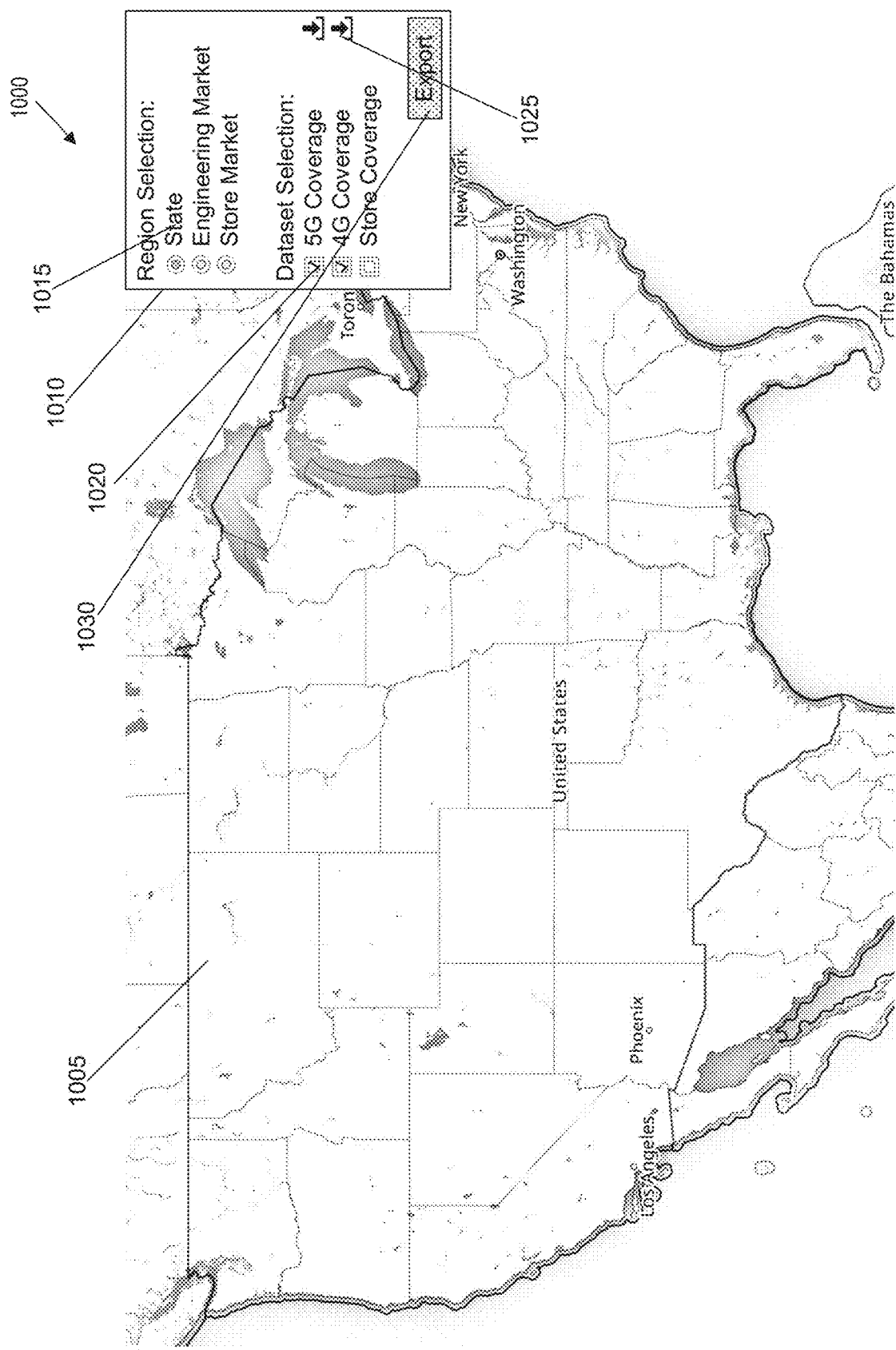
FIG. 10 shows an example user interface according to some implementations.

FIG. 10 shows an example user interface for selecting data, regions, and so forth. The user interface 1000 can include a map area 1005 and an input sheet 1010. The input sheet 1010 can be an overlay, dropdown, separate window, or any other suitable user interface element. The input sheet 1010 can include options 1015 to select a region type or geographic area type, for example a user can select state, engineering market, store market, or any other predefined geographic area type. The input sheet 1010 can include options 1020 to select one or more datasets. The input sheet 1010 can include an export button 1030 that can be used to export selected data. The input sheet 1010 can include icons 1025 that indicate that a dataset can be exported or downloaded.

Figure 11:
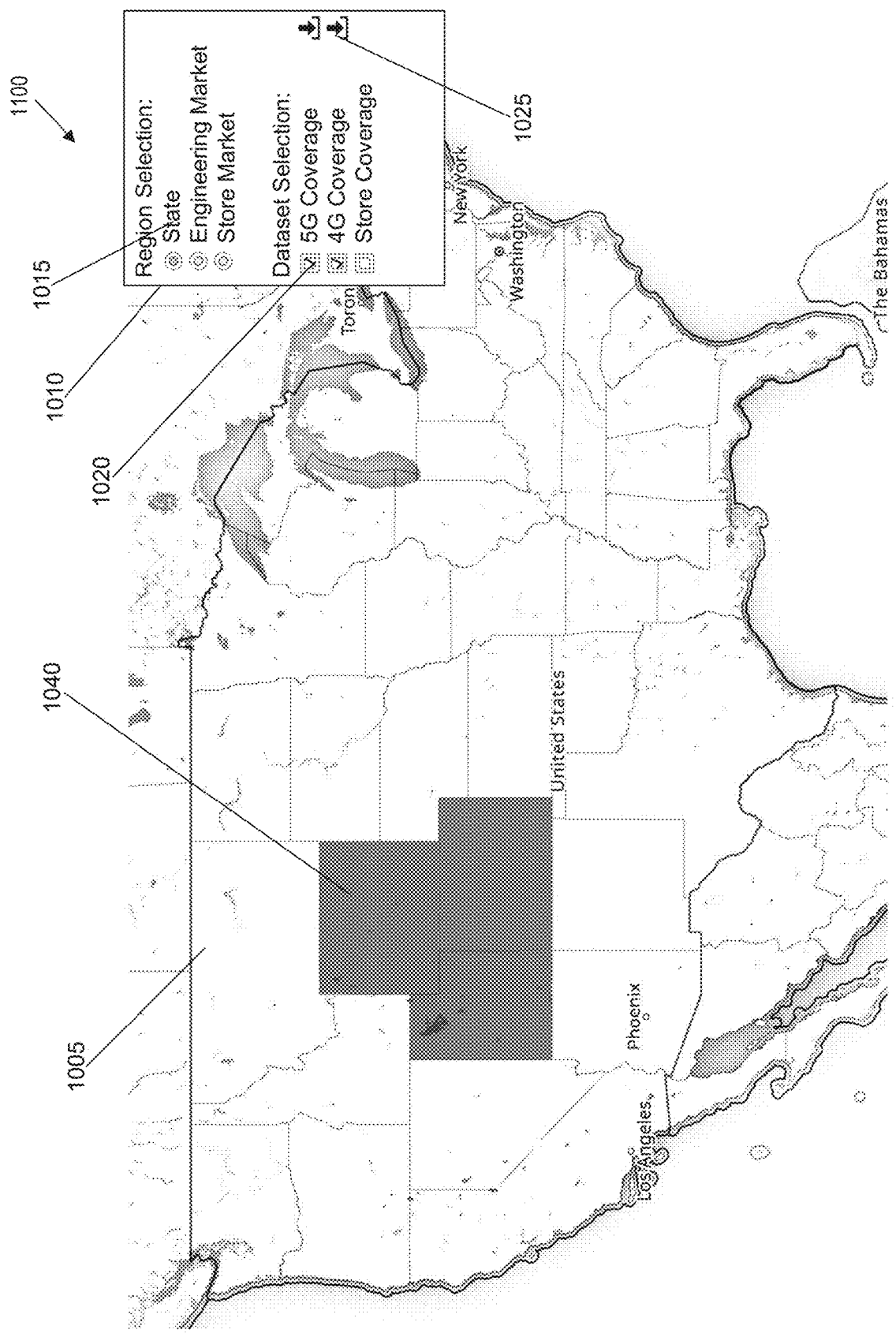
FIG. 11 shows another example user interface according to some implementations.

FIG. 11 shows an example user interface 1100 for selecting data, selecting regions, and exporting data. In FIG. 11, a user has selected "State" as the geographic area type in the interface 1100. The states 1040 can be selected states. For example, the user can click on an unselected state to select the state and can click on a selected state to unselect the state. In some implementations, a user can click a state to select it, and can hold down a modifier key (e.g., a control key or a command key) to select additional states. While states are used as the geographic area type in FIG. 11, any other predefined geographic area type can be selected. Additionally, while the selected states form a continuous area in FIG. 11, it is not required that selected regions be adjacent to one another.

Figure 12:
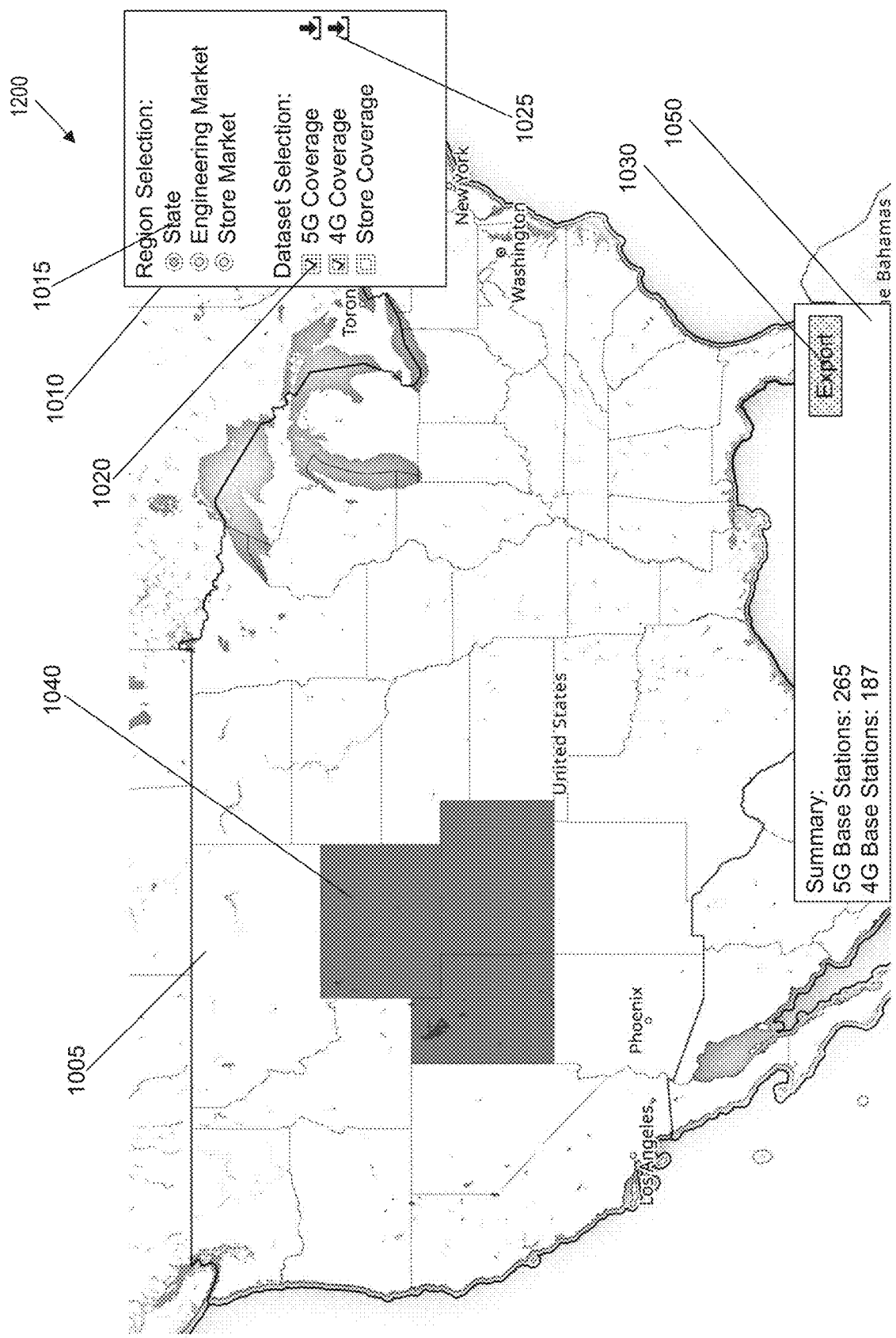
FIG. 12 shows another example user interface according to some implementations.

FIG. 12 shows an example user interface for selecting data, selecting regions, viewing data summaries, and exporting data. The user interface 1200 is similar to the user interface 1000. The user interface 1200 can include a summary sheet 1050. The summary sheet 1050 can show a summary of data selected using the options 1020. For example, in FIG. 12, a user has selected to see 5G Coverage and 4G Coverage datasets. The summary sheet 1050 shows the number of 5G base stations and the number of 4G base stations in the selected states 1040. In FIG. 12, the export button 1030 has been moved from the input sheet 1010 to the summary sheet 1050 but can function in a similar or identical manner.

Computer System

Figure 13:
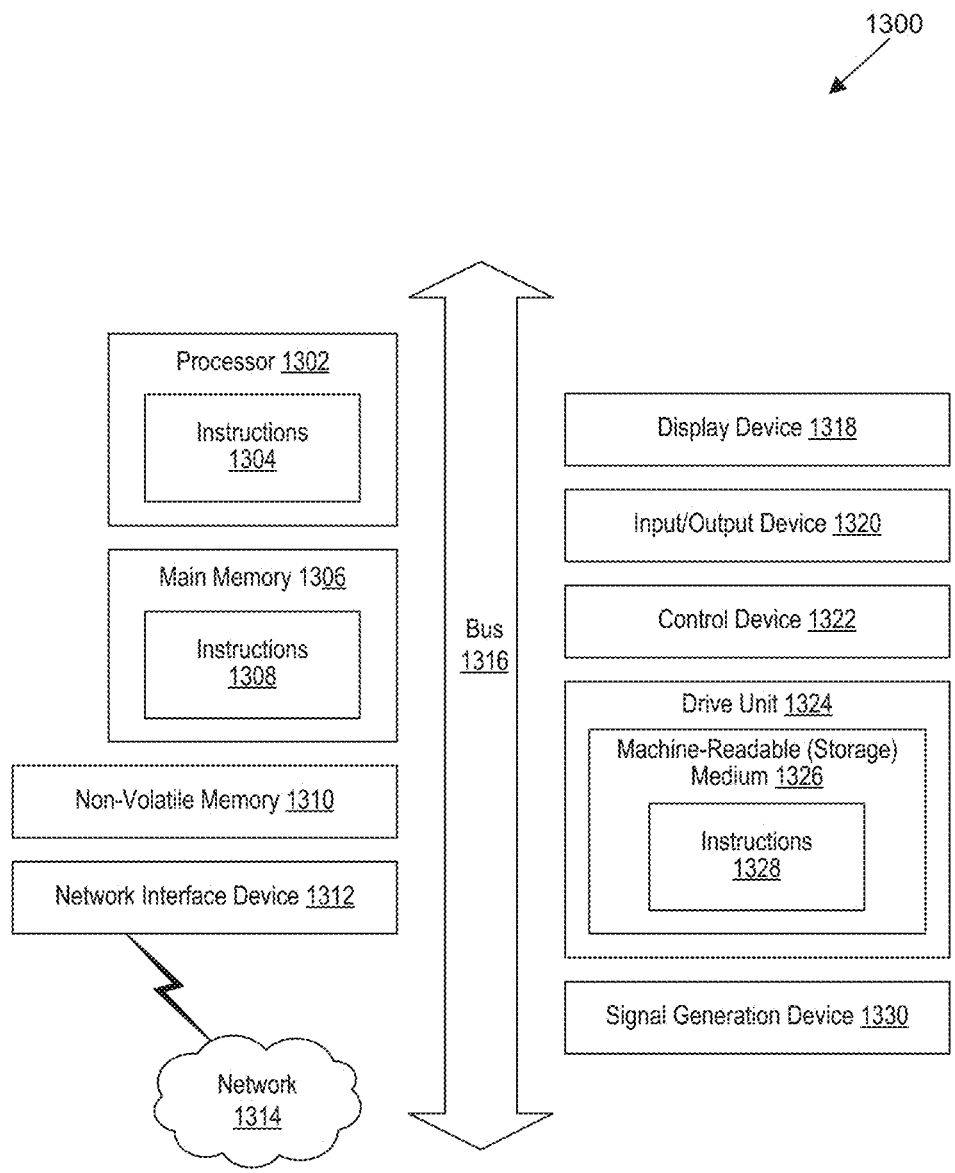
FIG. 13 is a block diagram that illustrates an example of a computer system in which at least some operations described herein can be implemented.

FIG. 13 is a block diagram that illustrates an example of a computer system 1300 in which at least some operations described herein can be implemented. As shown, the computer system 1300 can include: one or more processors 1302, main memory 1306, non-volatile memory 1310, a network interface device 1312, a video display device 1318, an input/output device 1320, a control device 1322 (e.g., keyboard and pointing device), a drive unit 1324 that includes a machine-readable (storage) medium 1326, and a signal generation device 1330 that are communicatively connected to a bus 1316. The bus 1316 represents one or more physical buses and/or point-to-point connections that are connected by appropriate bridges, adapters, or controllers. Various common components (e.g., cache memory) are omitted from FIG. 13 for brevity. Instead, the computer system 1300 is intended to illustrate a hardware device on which components illustrated or described relative to the examples of the figures and any other components described in this specification can be implemented.

The computer system 1300 can take any suitable physical form. For example, the computing system 1300 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1300. In some implementations, the computer system 1300 can be an embedded computer system, a system-on-chip (SOC), a single-board computer system (SBC), or a distributed system such as a mesh of computer systems, or it can include one or more cloud components in one or more networks. Where appropriate, one or more computer systems 1300 can perform operations in real time, in near real time, or in batch mode.

The network interface device 1312 enables the computing system 1300 to mediate data in a network 1314 with an entity that is external to the computing system 1300 through any communication protocol supported by the computing system 1300 and the external entity. Examples of the network interface device 1312 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1306, non-volatile memory 1310, machine-readable medium 1326) can be local, remote, or distributed. Although shown as a single medium, the machine-readable medium 1326 can include multiple media (e.g., a centralized/distributed database and/or associated caches and servers) that store one or more sets of instructions 1328. The machine-readable medium 1326 can include any medium that is capable of storing, encoding, or carrying a set of instructions for execution by the computing system 1300. The machine-readable medium 1326 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1310, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1304, 1308, 1328) set at various times in various memory and storage devices in computing device(s). When read and executed by the processor 1302, the instruction(s) cause the computing system 1300 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

What is claimed is:

1. A system for geospatial analysis of wireless telecommunications network data, the system comprising:
   at least one hardware processor;
   at least one non-transitory memory storing instructions executable by the at least one hardware processor;

a geospatial data module configured to:
   receive a plurality of datasets from a plurality of data sources, each dataset of the plurality of datasets comprising a plurality of records, wherein at least one dataset of the plurality of datasets comprises coverage data for a wireless telecommunications network;
   transform each record of each dataset of the plurality of datasets to a standardized format;
   determine, for each record of the plurality of records, one or more predefined geographic areas corresponding to the record, each predefined geographic area having a geographic area type associated therewith, wherein the determining comprises performing one or more geospatial calculations prior to receiving a request from a user for information comprising at least one of the one or more predefined geographic areas corresponding to the record;
   associate each record with the corresponding one or more predefined geographic areas; and
   generate, for each dataset of the plurality of datasets, a transformed dataset, each transformed dataset comprising transformed records of the dataset and one or more indications of the one or more associated predefined geographic areas;
a data presentation module configured to:
   provide, to a user via a graphical user interface, a map, a first input for selecting at least one transformed dataset, and a second input for selecting a geographic area type;
   receive, from the user using the first input, a selection of at least one transformed dataset;
   receive, from the user using the second input, a selection of a geographic area type; and
   receive, from the user using the map, a selection of a geographic area; and
a data export module configured to:
   generate, based on the selected at least one transformed dataset and the selected geographic area, an output dataset; and
   make the output dataset available to the user.

2. The system of claim 1, wherein the output dataset comprises at least one of a comma separated value file, a tab separated value file, an xml file, a JSON file, an Office Open XML Workbook file, an OpenDocument spreadsheet file, a Tableau file, an Apache Parquet file, an Esri Shapefile file, a Geographic JavaScript Object Notation (GeoJSON) file, a Geography Markup Language (GML) file, a Google Keyhole Markup Language (KML) file, a GPS Exchange Format (GPX) file, or an OpenStreetMap XML (OSM) file.

3. The system of claim 1, wherein the geographic area types of comprise at least one of a store footprint area, a network coverage area, competitor area, engineering market, engineering region, sales region, FCC area, FCC auction area, metropolitan statistical area, combined statistical area, county, state, city, zip code, local access and transport area, designated market area, or core-based statistical area.

4. The system of claim 1, wherein to generate the output dataset, the data export module is configured to:
   determine a role of the user; and
   determining, based on the role of the user, that the user has a data export permission, wherein the data export permission indicates that the user has permission to export data.

5. The system of claim 1, wherein to generate the output dataset, the data export module is configured to:
   query, using a first lambda function, a first transformed dataset of the at least one transformed dataset, the querying configured to select one or more records of the first transformed dataset associated with the selected geographic area, wherein the querying results in a first output dataset; and
   clean, using a second lambda function, the first output dataset, the cleaning comprising one or more of removing an attribute from the first output dataset or reformatting an attribute of the first output dataset.

6. The system of claim 5, wherein the at least one transformed dataset comprises at least two transformed datasets, wherein to generate the output dataset, the data export module is further configured to:
   query, using a third lambda function, a second transformed dataset of the least one transformed dataset, the querying configured to select one or more records of the second transformed dataset associated with the selected geographic area, wherein the querying results in a second output dataset;
   clean, using a fourth lambda function, the second output dataset, the cleaning comprising one or more of removing an attribute from the second output dataset or changing a format of an attribute of the second output dataset; and
   merge the first output dataset and the second output dataset to generate the output dataset.

7. The system of claim 6, wherein querying the first transformed dataset and querying the second transformed dataset are performed substantially in parallel.

8. The system of claim 6, wherein the first lambda function and the second lambda function are executed on a first state machine, and wherein the third lambda function and the fourth lambda function are executed on a second state machine.

9. A computer-implemented method for geospatial analysis of wireless telecommunications network data, the method comprising:
   receiving a plurality of datasets from a plurality of data sources, each dataset of the plurality of datasets comprising a plurality of records, wherein at least one dataset of the plurality of datasets comprises coverage data for a wireless telecommunications network;
   transforming each record of each dataset of the plurality of datasets to a standardized format;
   determining, for each record of the plurality of records, one or more predefined geographic areas corresponding to the record, each predefined geographic area having a geographic area type associated therewith, wherein the determining comprises performing one or more geospatial calculations prior to receiving a request from a user for information comprising at least one of the one or more predefined geographic areas corresponding to the record;
   associating each record with the corresponding one or more predefined geographic areas;
   generating, for each dataset of the plurality of datasets, a transformed dataset, each transformed dataset comprising transformed records of the dataset and one or more indications of the one or more associated predefined geographic areas;
   providing, to a user via a graphical user interface, a map, a first input for selecting at least one transformed dataset, and a second input for selecting a geographic area type;
   receiving, from the user using the first input, a selection of at least one transformed dataset;

receiving, from the user using the second input, a selection of a geographic area type;

receiving, from the user using the map, a selection of a geographic area;

receiving, from the user using the graphical user interface, an indication to export the selected at least one transformed dataset;

generating, based on the selected at least one transformed dataset and the selected geographic area, an output dataset; and making the output dataset available to the user.

10. The computer-implemented method of claim 9, wherein the output dataset comprises at least one of a comma separated value file, a tab separated value file, an xml file, a JSON file, an Office Open XML Workbook file, an OpenDocument spreadsheet file, a Tableau file, an Apache Parquet file, an Esri Shapefile file, a Geographic JavaScript Object Notation (GeoJSON) file, a Geography Markup Language (GML) file, a Google Keyhole Markup Language (KML) file, a GPS Exchange Format (GPX) file, or an OpenStreetMap XML (OSM) file.

11. The computer-implemented method of claim 9, wherein the geographic area types of comprise at least one of a store footprint area, a network coverage area, competitor area, engineering market, engineering region, sales region, FCC area, FCC auction area, metropolitan statistical area, combined statistical area, county, state, city, zip code, local access and transport area, designated market area, or core-based statistical area.

12. The computer-implemented method of claim 9, wherein generating the output dataset comprises:

determining a role of the user; and determining, based on the role of the user, that the user has a data export permission, wherein the data export permission indicates that the user has permission to export data.

13. The computer-implemented method of claim 9, wherein generating the output dataset comprises:

querying, using a first lambda function, a first transformed dataset of the at least one transformed dataset, the querying configured to select one or more records of the first transformed dataset associated with the selected geographic area, wherein the querying results in a first output dataset; and cleaning, using a second lambda function, the first output dataset, the cleaning comprising one or more of removing an attribute from the first output dataset or reformatting an attribute of the first output dataset.

14. The computer-implemented method of claim 13, wherein the at least one transformed dataset comprises at least two transformed datasets, wherein generating the output dataset further comprising:

querying, using a third lambda function, a second transformed dataset of the least one transformed dataset, the querying configured to select one or more records of the second transformed dataset associated with the selected geographic area, wherein the querying results in a second output dataset;

cleaning, using a fourth lambda function, the second output dataset, the cleaning comprising one or more of removing an attribute from the second output dataset or changing a format of an attribute of the second output dataset; and merging the first output dataset and the second output dataset to generate the output dataset.

15. The computer-implemented method of claim 14, wherein the first lambda function and the second lambda function are executed on a first state machine, and wherein the third lambda function and the fourth lambda function are executed on a second state machine.

16. The computer-implemented method of claim 14, wherein querying the first transformed dataset and querying the second transformed dataset are performed substantially in parallel.

17. A non-transitory, computer-readable storage medium for geospatial analysis of wireless telecommunications network data comprising instructions recorded thereon, wherein the instructions when executed by at least one data processor of a system, cause the system to:

receive a plurality of datasets from a plurality of data sources, each dataset of the plurality of datasets comprising a plurality of records, wherein at least one of dataset of the plurality of datasets comprises coverage data for a wireless telecommunications network;

transform each record of each dataset of the plurality of datasets to a standardized format;

determine, for each record of the plurality of records, one or more predefined geographic areas corresponding to the record, each predefined geographic area having a geographic area type associated therewith, wherein the determining comprises performing one or more geospatial calculations prior to receiving a request from a user for information comprising at least one of the one or more predefined geographic areas corresponding to the record;

associate each record with the corresponding one or more predefined geographic areas;

generate, for each dataset of the plurality of datasets, a transformed dataset, each transformed dataset comprising transformed records of the dataset and one or more indications of the one or more associated predefined geographic areas;

provide, to a user via a graphical user interface, a map, a first input for selected at least one transformed dataset, and a second input for selecting a geographic area type;

receive, from the user using the first input, a selection of at least one transformed dataset;

receive, from the user using the second input, a selection of a geographic area type;

receive, from the user using the map, a selection of a geographic area;

generate, based on the selected at least one transformed dataset and the selected geographic area, an output dataset; and make the output dataset available to the user.

18. The non-transitory, computer-readable storage medium of claim 17, wherein the instructions, when executed by the at least one data processor of the system, further cause the system to:

query, using a first lambda function, a first transformed dataset of the at least one transformed dataset, the querying configured to select one or more records of the first transformed dataset associated with the selected geographic area, wherein the querying results in a first output dataset; and clean, using a second lambda function, the first output dataset, the cleaning comprising one or more of removing an attribute from the first output dataset or reformatting an attribute of the first output dataset.

19. The non-transitory, computer-readable storage medium of claim 18, wherein the instructions, when executed by the at least one data processor of the system, further cause the system to:

query, using a third lambda function, a second transformed dataset of the least one transformed dataset, the querying configured to select one or more records of the second transformed dataset associated with the selected geographic area, wherein the querying results in a second output dataset;

clean, using a fourth lambda function, the second output dataset, the cleaning comprising one or more of removing an attribute from the second output dataset or changing a format of an attribute of the second output dataset; and merge the first output dataset and the second output dataset to generate the output dataset.

20. The non-transitory, computer-readable storage medium of claim 17, wherein the instructions, when executed by the at least one data processor of the system, further cause the system to:

determine a role of the user; and determine, based on the role of the user, that the user has a data export permission, wherein the data export permission indicates that the user has permission to export data.

\* \* \* \* \*